United States Patent Office 3,291,785
Patented Dec. 13, 1966

3,291,785
DIOLS OF THE REACTION PRODUCT OF ROSIN AND BETA-PROPIOLACTONE
Noah J. Halbrook and Ray V. Lawrence, Lake City, Fla., assignors to the United States of America as represented by the Secretary of Agriculture
No Drawing. Filed Mar. 16, 1965, Ser. No. 440,328
2 Claims. (Cl. 260—97)

A non-exclusive, irrevocable, royalty-free license in the invention herein described, throughout the world for all purposes of the United States Government, with the power to grant sublicenses for such purposes, is hereby granted to the Government of the United States of America.

This invention relates to alcohols prepared from the adducts formed by the Diels-Alder type addition of β-propiolactone to levopimaric acid. More specifically, this invention relates to certain of the isomeric diols and to the diol mixtures obtained by reducing the β-propiolactone adducts of levopimaric acid. This invention also relates to the mixture of monohydric and dihydric alcohols obtained by the reduction of the condensation products of rosin (wood, gum, or tall oil), and β-propiolactone.

The main object of this invention is to provide new modified rosin derivatives useful as modifiers to control crystallinity of polyesters, such as Dacron, Kodel, etc.

We have prepared a mixture of isomeric diols by separating and subsequently reducing the dicarboxylic acids that result from the condensation of rosin and β-propiolactone. Reduction of the crude rosin β-propiolactone condensation product yields a mixture of mono- and dihydric alcohols. The monohydric alcohols of the mixture are derived principally from the pimaric type acids of rosin which do not undergo diene-type reactions.

The literature indicates that gum rosin, which is obtained from the distillation of pine gum, contains 57 to 60% of abietic type acids. Initially about 30% of the pine gum is levopimaric, but the said levopimaric acid, because it is sensitive to heat and acids, is isomerized to other type abietic type acids during the distillation of the turpentine from the gum. The levopimaric acid is so readily isomerized that it cannot be detected in rosin. The abietic type acids of rosin form Diels-Alder condensation products which have the structure of that expected when levopimaric acid condenses with β-propiolactone (or other dienophiles by α-face approach.

The abietic type acids are present in gum rosin in the percentages indicated here:

Levopimaric acid—Infinitesimal, percent
Abietic acid—18%
Neoabietic acid—19%
Palustric acid—19%

Two of the alcohols which are part of our invention were prepared in pure form from two isomeric dicarboxylic acids that had been isolated from the reaction product of rosin and β-propiolactone. Methyl esters were prepared from the mixture of dicarboxylic acids obtained from the condensation product of rosin and β-propiolactone. Gas-liquid chromatographic analysis showed four esters to be present, which could only be derived from four dicarboxylic acids. The existence of the four dicarboxylic acids and the structures of the two alcohols obtained in pure form were recently disclosed in our article, "Structure and Stereochemistry of Diels-Alder Adducts of Levopimaric Acid," Journal of Organic Chemistry, 29, 1017–1021 (1964). The structures of the dihydric alcohols that we have obtained in the pure form are I and II shown below. The NMR spectra of the dicarboxylic acids show that adduct formation was by α-face approach, which limits the possible isomers to four. The structure of the two dihydric alcohols not isolated, then, is a mixture of III and IV, shown below.

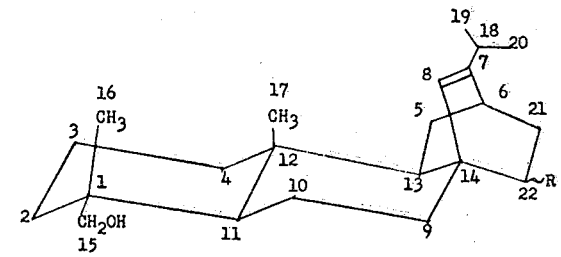

I  R=endo-CH₂OH
II R=exo-CH₂OH

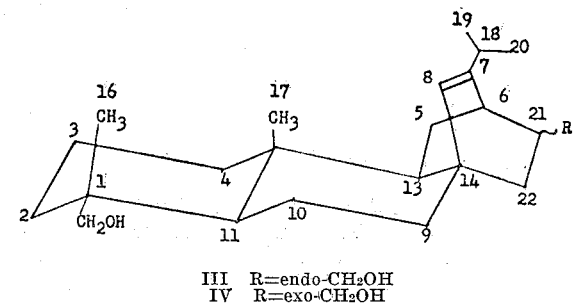

III R=endo-CH₂OH
IV  R=exo-CH₂OH

Several general methods which may be used for the preparation of alcohols include catalytic reduction of the corresponding acids or esters of the acids, reduction of esters of the corresponding acids with sodium or sodium hydride and reduction of the acid with an alkali metal aluminum hydride. The alcohols of this invention were prepared from the corresponding acids by reduction with lithium aluminum hydride. Reduction of the crude β-propiolactone adduct of rosin containing the four isomeric dicarboxylic acids along with other rosin acids gave a 99% conversion of all acids to alcohols. Methods for preparing the dicarboxylic acids have been described in our copending application, Serial No. 392,661, filed August 27, 1964, and in our publication, J. Org. Chem., 29, 1017 (1964).

The alcohols which are a product of our invention were prepared from the corresponding acids by reduction with lithium aluminum hydride, using a ratio of about one to five moles of the hydride per mole of the adduct. The reduction is best carried out under an inert gas at temperatures about from 0° to 50° C. We prefer to carry out the reduction at about from 15° to 35° C. The alkali metal aluminum complex—and intermediate product formed in the reaction—is readily hydrolyzed by well established procedures to yield the desired alcohol. The separation of the alcohols from the reactant mixture will depend on the solvent used. In general, recovery is effected by separation of the water-immiscible phase from the hydrolyzed mixture, washing, and concentration or complete evaporation of the solvent.

The diols which are the subject of this invention react normally with saturated and unsaturated dicarboxylic acids to give polyesters. When esterified with unsaturated dibasic acids, such as maleic or fumaric acid, the resulting polyesters can be copolymerized with styrene. When used to modify unsaturated polyester resins, the rosin-derived diols increase the solubility of the ester vinyl monomers and decrease the tendency of the polyester to crystallize. Aromatic groups increase the flexibility and resistance to cracking and grazing in the cured polyester monomer copolymer. Aromatic dicarboxylic acids are normally used for this purpose, but use of our diols eliminate this need and, in addition, reduce the amount of conventional polyis needed for esterification of the carboxyl groups. Unsaturated polyesters of fumaric acid or maleic anhydride were modified during processing by replacing part of the requisite glycols, i.e., diethylene, propylene, ethylene glycol with our rosin-derived alcohols. The so modified esters had low acid numbers, high ball and ring softening points, 80° to 90° C., and were soluble in styrene. The unsaturated polyesters modified with our rosin-derived diols are almost colorless. The unsaturated polyesters containing crude mixtures of our rosin-derived alcohols are light amber in color. These modified resins have utility as laminating resins, that is, various fibers, natural or synthetic, may be impregnated with vinyl monomer dilutions of the resin, and the mass cured into a single reinforced structure. Both the castings and the laminates thus produced have excellent strength characteristics, are resistant to weathering and to attack by toluene, or by any of the following aqueous solutions: 10% alkali, 30% sulfuric acid, and 50% ethanol.

The following examples will illustrate the preparation and the use of the alcohols which are the subject of this invention.

Example 1

*Step 1.*—A reaction vessel equipped with stirrer, inert gas inlet, water condenser, and trap was charged with 30.2 grams of levopimaric acid $[\alpha]_D^{25}$ −267.5°, and 10.8 grams of β-propiolactone. The flask was heated in an oil bath to 225° C., over a 45-minute interval and held at that temperature for three hours. While heating, the flask contents were kept under a blanket of nitrogen. The reaction product was almost colorless, had a neutral equivalent of 193, and $[\alpha]_D^{25}$ +23.4°. The yield was 37.6 grams.

*Step 2.*—Thirty-two grams of the reaction product were dissolved in carbon tetrachloride, and the crystals formed were collected and dried at 160° C. and 0.5 mm. pressure for four hours. The neutral equivalent was 187.0; $[\alpha]_D^{25}$ +25.8°; and the actual yield 15.5 grams.

*Step 3.*—The carbon tetrachloride liquors (i.e., the filtrates from Step 2 above) were extracted with 100 grams of 2% aqueous sodium bicarbonate solution in three portions. The bicarbonate extraction was acidified with 6 N hydrochloric acid, and the free dicarboxylic acids then extracted with ether. The ether extract was water washed, dried over sodium sulfate, stripped of solvent, and the acids thus isolated dried at 100° C. and 0.5 mm. pressure for three hours. The yield of acids was 13.1 grams $[\alpha]_D^{25}$ +20.0°; and the neutral equivalent 191.

Example 2

*Step 1.*—A reaction vessel equipped with stirrer, inert gas inlet, thermometer, thermocouple, water condenser, and trap was charged with 1,000 grams of WW grade gum rosin, which contained approximately 60% abietic type acids (acid number of 166). The rosin was heated under an inert atmosphere to 170° C. and 200 grams of technical grade β-propiolactone was added over a ten minute interval. The temperature was then raised to 225° C. over a thirty minute interval and held at 225° C. for four hours. During heating, ten grams of the mixture distilled out at 210–220° C. This portion was discarded. The modified rosin had a color grade N on the rosin color scale, an acid number of 243, and a ball and ring softening point of 126° C. The ultraviolet absorption spectrum of the sample indicated that it contained less than 5% unreacted abietic-type acids.

*Step 2.*—One-hundred grams of the modified rosin were dissolved in 300 ml. of carbon tetrachloride. The crystals which formed were separated by filtration and air dried to give 44 grams of a carbon tetrachloride solvate. The carbon tetrachloride solvate of gum rosin-β-propiolactone adduct obtained corresponds to an empirical formula of $2C_{23}H_{34}O_4 \cdot 3CCl_4$, and had a neutralization equivalent of 306. This compound had a melting point of 186–187° C.

The solvate was dried at 150° C. and 0.5 mm. pressure for four hours to give 31 grams of a solvent-free dicarboxylic acid, which had a neutralization equivalent of 191.0, and $[\alpha]_D^{25}$ +24.4°. All rotations reported herein were determined on a 2% solution of the product in ethanol. The product was recrystallized from benzene with which solvent the compound formed a solvate which had a neutral equivalent of 250.4 and a melting point of 186–187° C. The solvent-free product was obtained by drying the solvate at 160° C. and 0.5 mm. pressure for four hours. The yield was 290 grams: the product had $[\alpha]_D^{25}$ +25.8°, and a melting point of 222–222.5° C.

*Analysis.*—Calculated for $C_{23}H_{34}O_4$. Theoretical: 73.76% carbon, 9.15% hydrogen, Neut. Eq. 187.3. Found: 73.76% carbon, 9.10% hydrogen, Neut. Eq. 187.3.

*Step 3.*—The carbon tetrachloride was evaporated from the filtrates of Step 2 above to give a resinous material which was dissolved in ethyl ether, then extracted with 2% aqueous sodium bicarbonate. The sodium bicarbonate solution was acidified with 6 N hydrochloric acid and extracted with ethyl ether. The ether extract was washed, dried over sodium sulfate, evaporated, and the free acids dried at 100° C. and 0.5 mm. pressure for three hours to give 25.2 grams of dicarboxylic acids. The acid mixture had a neutralization equivalent of 194.0; $[\alpha]_D^{25}$ +16.8°; and a melting point of 145–152° C.

The acid mixture was dissolved in isooctane-ethyl ether (80:20), and the precipitate which formed on slow evaporation of the ether was collected in three portions. The center portion was crystallized from ethanol-water, and was dried at 100° C. and 0.5 mm. pressure for three hours to give 9.1 grams of a second (as distinguished from the product of Step 2 above) dicarboxylic acid. This second product had $[\alpha]_D^{25}$ + 68.2; and a melting point of 268–269° C.

*Analysis.*—Calculated for $C_{23}H_{34}O_4$. Theroretical: 73.76% carbon, 9.15% hydrogen. Found: 73.68% carbon, 9.05% hydrogen.

Example 3

A closed reaction vessel equipped with stirrer, reflux condenser, inert gas inlet, and dropping funnel was filled with nitrogen and charged with 13 grams of lithium aluminum hydride slurried in 100 grams of ethyl ether. A solution of 10 grams of the dicarboxylic acid of Example 2, Step 2, in 100 grams of ethyl ether was added slowly, care being taken to control frothing. The reaction vessel contents were refluxed with stirring for four hours. During reflux, the reactants were kept blanketed with an atmosphere of nitrogen. Excess lithium aluminum hydride was hydrolyzed with water and 20% aqueous sodium hydroxide. The ether solution was separated, washed, and then dried over sodium sulfate. The ether was partially evaporated, and the alcohol, which is a product of our invention, was crystallized. The yield was 9.6 grams. The melting point of the alcohol was 163–165° C. One crystallization from acetone gave the analytical sample which is the product with structural Formula I. This product had a melting point of 166–167° C.; $[\alpha]_D^{25}$ 0°; infrared

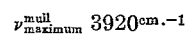
$\nu_{\text{maximum}}^{\text{mull}}$ 3920 cm.$^{-1}$

*Analysis.* — Calculated for $C_{23}H_{38}O_2$. Theoretical: 79.71% carbon, 11.05% hydrogen. Found: 79.62% carbon, 10.91% hydrogen.

Example 4

A reaction vessel equipped as in Example 3 was flushed with nitrogen and charged with 200 grams of an ethyl ether solution containing 3.5 grams of lithium aluminum hydride. A solution of 7.5 grams of the dicarboxylic acid of Example 2, Step 3, in 75 grams of ethyl ether was added slowly so as to control frothing. The solution was refluxed with stirring under a nitrogen atmosphere for 3½ hours. Excess lithium aluminum hydride was then hydrolyzed with water and 20% aqueous sodium hydroxide. The ether solution was washed with water over sodium sulfate. The ether was evaporated to give 65.2 grams of the product, which product was recrystallized once from hexane. The recrystallized product had a melting point of 125–126.5° C.; $[\alpha]_D^{25}$ —86.0; infrared

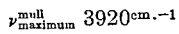
$\nu_{maximum}^{mull}$ 3920cm.$^{-1}$

*Analysis.* — Calculated for $C_{23}H_{38}O_2$. Theoretical: 79.71% carbon, 11.05% hydrogen. Found: 79.75% carbon, 11.11% hydrogen.

This product is the compound represented by structural Formula II above.

Example 5

A reaction vessel equipped as in Example 3 was flushed with nitrogen and charged with 200 grams of ethyl ether containing 25 grams of lithium aluminum hydride. A solution of 50 grams of the modified rosin of Example 2, Step 1, in 300 grams of ethyl ether was added slowly. The solution was stirred slowly until frothing ceased and let stand under a blanket of nitrogen overnight. Water was added to hydrolyze the excess lithium aluminum hydride, and the charge was made acid with excess 6 N hydrochloric acid. The ether solution containing the rosin-derived alcohols was separated, washed until free of acid, dried over sodium surfate, and the ether evaporated. A yield of 46 grams, which is 98% of the theoretical yield, was obtained. The product was composed of mixed rosin-based alcohols, hydroxyl value 249.

Example 6

*Step 1.*—A modified styrenated polyester laminating resin was prepared in which the mixed rosin-derived alcohols of Example 5 were used as a modifier. A reaction vessel equipped with stirrer, inert gas inlet, water trap, and condenser was charged with 200 grams of the rosin-derived alcohols (hydroxyl value of 248), 185 grams of fumaric acid, and 78 grams of diethylene glycol. The contents of the reaction vessel were heated with stirring under nitrogen at 185–190° C. for nine hours. The polyester had an acid number of 57, and was a friable solid at room temperature. The softening point by the ball and ring method was 95° C.

*Step 2.*—A laminating resin was prepared by adding 40 grams of styrene to 60 grams of the modified polyester of Step 1 above. The resin was prepared by adding 1% benzoyl peroxide, pouring the catalyzed resin in a mold, and heating two hours at 80° C., then three hours at 120° C. The copolymer casting when removed from the mold was clear, light amber in color, and had a reading of 40 on the model 934–1 Barcol hardness tester.

The sample specimens showed no visible effect on 24 hour immersion in water, in toluene, or in an aqueous solution of any of the following: 10% sodium hydroxide, 30% sulfuric acid, and 50% ethanol. The weight gain percent of the sample specimens after immersion is as follows:

| | |
|---|---|
| In water | 0.211 |
| In 10% sodium hydroxide | 0.133 |
| In 30% Sulfuric acid | 0.125 |
| In 50% ethanol | 0.220 |
| In toluene | 0.190 |

The Barcol hardness in no case dropped more than two units.

Example 7

*Step 1.*—A modified styrenated polyester laminating resin was prepared in which the dihydric alcohol of Example 3 was used as a modifier. A reaction vessel equipped with stirrer, inert gas inlet, water trap, and condenser was charged with 346 grams of the said dihydric alcohol which had a hydroxyl value of 318, 348 grams of fumaric acid, and 232 grams of diethylene glycol. A slow stream of nitrogen was used to blanket the vessel contents. The temperature was raised to 185° C. over a one-half hour interval, then held at 185–190° C. for six hours. The polyester was a tough solid at room temperature, was colorless, and had an acid number of 22. The softening point by the ball and ring method was 92° C.

*Step 2.*—A laminating resin was prepared by adding 35 grams of styrene to 65 grams of the polyester. The resin was cured by adding 1% benzoyl peroxide, pouring in a mold, and heating two hours at 80° C., then two hours at 120° C. The copolymer casting was clear, almost colorless, and had a reading of 42 on the Model 934–1 Barcol hardness tester. The sample specimens showed no visible effect on 24 hour immersion in water, in toluene, or in an aqueous solution of any of the following: 10% sodium hydroxide, 30% sulfuric acid, and 50% ethanol.

Example 8

*Step 1.*—One-hundred grams of the rosin prepared in Example 1, Step 1, were dissolved in 500 grams of ethyl ether. The ether solution was extracted with 1,000 grams of 5% aqueous sodium bicarbonate in three portions. The sodium bicarbonate solution was acidified with 6 N hydrochloric acid, then extracted with ethyl ether. The ether was washed, dried over sodium sulfate, and evaporated. The acid residue on evaporation of the ether was dried at 100° C. and 0.5 mm. pressure for three hours to yield 60 grams dicarboxylic acids, which had a neutralization equivalent of 194.2; $[\alpha]_D^{25}$+19.30; melting point of 162–166° C.

*Step 2.*—A reaction vessel equipped as in Example 2 was flushed with nitrogen and charged with 200 grams of ethyl ether containing 25 grams of lithium aluminum hydride. A solution of 50 grams of the mixed acids of Step 1 in 300 grams of ethyl ether was added slowly. The solution was stirred until frothing ceased, then allowed to stand overnight under a blanket of nitrogen.

Water was added to hydrolize the excess lithium aluminum hydride, then the charge was made acid with 6 N hydrochloric acid. The ether solution containing the rosin-derived alcohols was washed until free of acid then dried over sodium sulfate, and the ether evaporated. A yield of 92 grams of the mixed dihydric alcohols was obtained. This mixture had a hydroxyl value of 314.

*Step 3.*—A modified styrenated polyester laminating resin was prepared in which the mixed diols of Step 2 were used as a modifier. A reaction vessel equipped with stirrer, inert gas inlet, water trap, and condenser was charged with 200 grams of the rosin-derived alcohols 202 grams of fumaric acid, and 50 grams of diethylene glycol. The contents of the reaction vessel were heated with stirring under nitrogen at 185–190° C. for seven hours. The polyester had an acid number of 28, and was light amber in color. The softening point by the ball and ring method was 89° C.

*Step 4.*—A laminating resin was prepared by adding 35 grams of styrene to 60 grams of the polymer. The viscosity of the dilution was Z–1 by the Gardner bubble viscometer method. The resin was cured by adding 1% benzoyl peroxide, pouring in a mold, and heating two hours at 80° C., then three hours at 120° C. The copolymer casting was clear, light amber, and had a value of 41 on the Barcol Model 934–1 hardness tester. The samples showed no visible effect after a 24 hour immersion in water, in toluene, and in an aqueous solution of any of the following: 10% sodium hydroxide, 30% sulfuric acid, and 50% ethanol.

Example 9

A saturated polyester resin was prepared in which the dihydric alcohol of Example 3 was used. A reaction vessel equipped with stirrer, inert gas inlet, water trap and condenser was charged with 84 grams of the diol and 35 grams of adipic acid. A slow stream of nitrogen was used to blanket the vessel contents. The temperature was raised to 240° C. over a one-hour interval, and held t 235° to 240° C. for seven hours. The polyester was clear, almost white, tough solid, with a ball and ring softening point of 99° C., the acid number was 3.7.

We claim:

1. The isomeric diol compounds represented by the formula

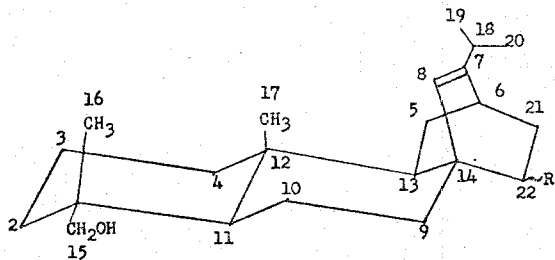

herein R is a —CH$_2$OH group spatially located endo r exo.

2. A process for preparing a composition of matter mprising a mixture of the isomeric diols of claim 1, hich process comprises reducing, under an inert gas ith lithium aluminum hydride at a temperature of about from 0° to 50° C., the product obtained by the reaction of rosin and β-propiolactone at 225° C., the lithium aluminum hydride and the reaction product of rosin and β-propiolactone being employed in a ratio of about one to five moles of the hydride per mole of the reaction product.

References Cited by the Examiner

UNITED STATES PATENTS 2,817,677   12/1957   Subluskey _____ 260—476

OTHER REFERENCES

Structure and Stereochemistry of Diels-Alder adducts of Levopimaric Acid, Journal of Organic Chemistry, vol. 29, No. 5, May 1964, pp. 1017–1021 relied on.

Industrial and Engineering Chemistry Product Research and Development, vol. 2, No. 3, September 1963, pp. 182–185 relied on.

Nystrom et al.: Journal of the American Chemical Society, vol. 69, May 1947, pp. 1197–1199 relied on.

LEON J. BERCOVITZ, *Primary Examiner.*

DONALD E. CZAJA, F. McKELVEY,

*Assistant Examiners.*